United States Patent [19]

Okada et al.

[11] Patent Number: 4,899,951

[45] Date of Patent: Feb. 13, 1990

[54] BRAKING MECHANISM FOR USE IN A MAGNETIC RECORDING APPARATUS

[75] Inventors: Hitoshi Okada; Shinichiro Terada; Katsuya Nozawa, all of Tokyo, Japan

[73] Assignee: Clarion Co., Ltd., Tokyo, Japan

[21] Appl. No.: 262,432

[22] Filed: Oct. 24, 1988

[30] Foreign Application Priority Data

Oct. 30, 1987 [JP] Japan ................................ 62-273517
Oct. 30, 1987 [JP] Japan ................................ 62-273518

[51] Int. Cl.⁴ .................... G11B 15/32; G11B 15/00; G11B 19/02
[52] U.S. Cl. ............................ 242/204; 242/156.2; 360/74.1; 360/96.3
[58] Field of Search ................ 242/204, 156.2; 360/74.1, 96.3

[56] References Cited

U.S. PATENT DOCUMENTS 4,708,302 11/1987 Yamaguchi et al. ............. 242/204
4,730,792 3/1988 Jang ............................... 242/204
4,747,564 5/1988 Tsubota .......................... 242/204

*Primary Examiner*—John Petrakes
*Attorney, Agent, or Firm*—Wallenstein, Wagner & Hattis, LTD.

[57] ABSTRACT

Disclosed is a braking mechanism for use in a magnetic recording apparatus essentially comprising a single cam gear and a brake-releasing member. The cam gear and the brake releasing member are so operatively connected that a stepwise rotation of the cam puts selected brake releasers in different brake releasing positions. Specifically in the first releasing position only the supply reel of the apparatus can rotate freely; in the second releasing position the take-up reel of the apparatus can rotate freely, and the supply reel can rotate against a relatively weak resistance; in the third releasing position the take-up and supply reel brakes can rotate freely together; and in unreleased position the supply and take-up reels cannot rotate.

The sequential releasing of selected brakes assures coordination of braking operations appropriate for tape-loading, unloading, quick winding, playing and stopping. Such a simple combination of a cam gear and a brake-releasing member according to present invention permits reduction of the number of required parts and the size of the brake control.

10 Claims, 7 Drawing Sheets

BRAKING MECHANISM FOR USE IN A MAGNETIC RECORDING APPARATUS

BACKGROUND OF THE INVENTION

1. Field of the Invention

The present invention relates to a braking mechanism for use in a taperecorder, videoplayer and other magnetic recording apparatuses.

2. Description of the Prior art

In general in a magnetic recording apparatus using a magnetic tape as recording medium, an idler gear is engaged with an associated reel base in play and quick-winding modes, and the idler gear is released from the reel base and at the same time a reel brake is applied to the reel base.

In a newly developed magnetic recording apparatus using a rotary head a loading block is made to: advance and pull out and wind the tape around the rotary head at the time of transition to the playing position (tape-loading operation); and withdraw and unwind the tape from the rotary head in transition to stopping and ejecting position (tape-unloading operation). The tape-loading is effected simply by moving the loading block, whereas the tape-unloading is effected by rotating the supply reel base in the direction in which the supply reel winds the tape. These tape-loading and unloading requires releasing of the reel brakes from the supply and take up reel bases respectively. Assume that both reel brakes are released to put both reel bases in free position. As mentioned earlier the tape-loading requires no reel base driving whereas the tape-unloading requires reel base driving. For this reason the amount of rotation in tape-loading is different from that in tape-unloading, and therefore the tape position with respect to the head in replaying is different from that in stop or ejection. In an attempt to reduce such deviation in tape position the reel brake is actuated to apply braking force to the take-up reel base whereas the supply reel base is allowed to rotate freely.

Additionally the magnetic recording apparatus has a preload brake to apply a light touch to the supply reel base in quick winding. Specifically when the supply reel base is rotating at an increased speed in quick winding mode, the moment of rotation which is applied to the supply reel base via the tape will increase, and if the supply reel base has a weak resistance to forced rotation, the supply base reel will rotate at a speed which is higher than required with the result that the supply reel supplies an excessive amount of tape which cannot be wound by the take-up reel, thus making the tape loose between the supply and take-up reels. The preload brake is used to make the tape tight between the supply and take-up reels by applying an appropriate constant braking force to the supply reel base to control the rotation of the supply reel.

The reel brakes and preload brake must be controlled to generate different braking forces at different times, and they have separate braking and releasing controls. Accordingly, the required parts increase in number, and the size of the apparatus becomes disadvantageously large. Further disadvantageously the structure of the apparatus is complicated.

SUMMARY OF THE INVENTION

One object of the present invention is to provide a braking device for use in a magnetic recording apparatus which is free of the defects mentioned above, that is, a braking device which is simple in structure, still performing timely controlling of all of the reel-brakes and the preload brake with accuracy.

To attain this object a braking mechanism for use in a magnetic recording apparatus according to the present invention uses a single cam gear and an associated brake-releasing member which are combined so as to make the brake-releasing member responsive to stepwise rotation of the cam gear to allow the reel brakes and the preload brake to release associated reel bases at proper times. Specifically, in the first releasing position which the cam gear and the brake-releasing member assume, only the supply reel brake is release; in the second releasing position the take-up and supply reel brakes are released; and in the third releasing position the take-up and supply reel brakes and the preload brake are released; and in the unrealising position no brakes are released.

The sequential releasing of selected brakes by using a single cam gear and associated brake-releasing member according to the present invention assures braking operations appropriate for tape-loading, unloading, quick winding, playing and stopping. A simple combination of a cam and a brake-releasing member according to the present invention permits reduction of the number of required parts and the size of the brake control.

Other objects and advantages of the present invention will be understood from the following description of preferred embodiments of the present invention, which are shown in the accompanying drawings:

FIGS. 1 to 4 are plane plan views of a braking mechanism according to one embodiment of the present invention in different operating modes: FIG. 1 shows tape-loading or unloading position; FIG. 2 shows forward-driving or playing position; FIG. 3 shows stop position; and FIG. 4 shows quick winding position.

FIG. 6 shows quick winding position; and FIG. 7 shows stop position.

PREFERRED EMBODIMENT OF THE INVENTION

Figure 1:
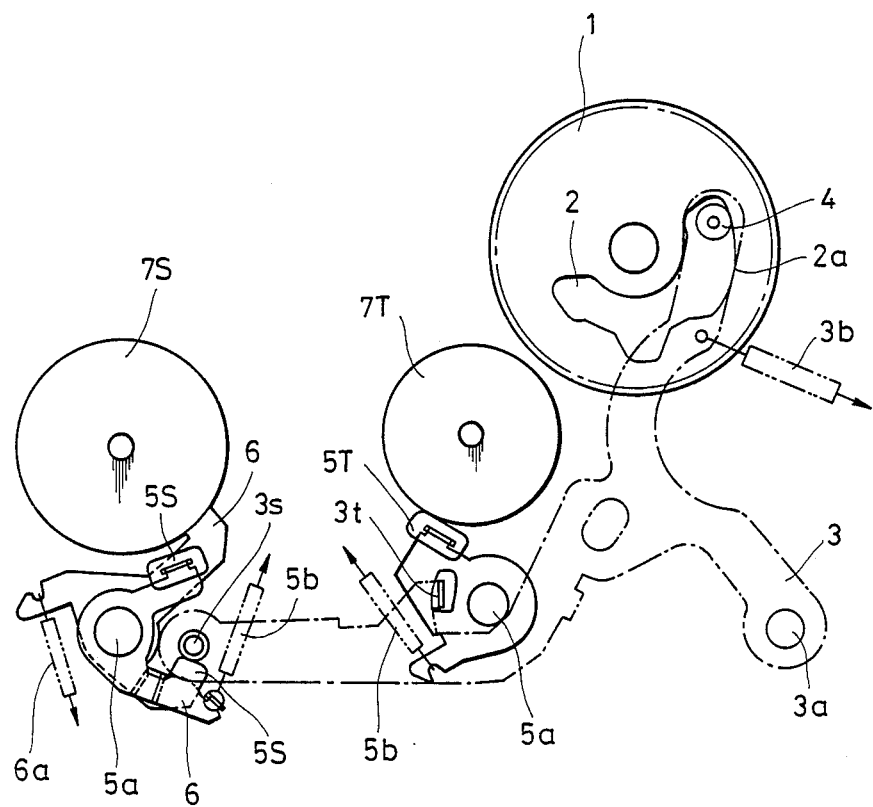

As shown in FIG. 1, a cam gear 1 has an irregularly shaped slot 2, and a roll follower 4 is slidably inserted in the irregularly shaped slot 2. The roller follower 4 is connected to one arm of a "Y"-shaped brake-releasing member 3.

Figure 5:
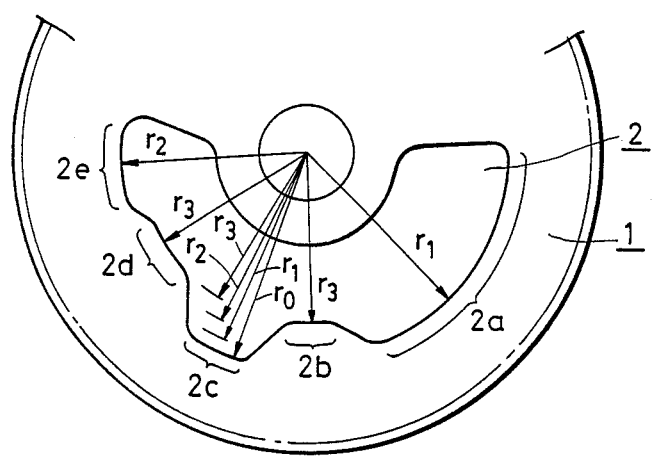
FIG. 5 is an enlarged fragmentary view of a cam gear.

As shown in FIG. 5, the slot 2 of the cam gear 1 has a plurality of arcs of different lengths and radii each called tape-loading control section 2a, forward-driving or playing control section 2b, stop control section 2c, reverse-driving control section 2d and quick winding control section 2e. The tape-loading control section 2a has a radius of $r_1$; the forward-driving or playing control section 2b has a radius of $r_3$; the stop control section 2c has a radius of $r_0$; the reverse-driving control section 2d has a radius of $r_3$ and the quick winding control section 2e has a radius of $r_2$. These radii are selected to satisfy the following relation:

$$r_0 > r_1 > r_2 > r_3$$

As shown in FIG. 1, the brake-releasing member 3 is fixed to its leg to rotate about its pivot 3a, and is pulled in non-releasing direction by spring 3b, thereby keeping the roll follower 4 in engagement with the contour of the slot 2 of the cam gear. Brake-releasers 3t and 3s are fixed to the other arm of the brake-releasing member 3. These brake releasers 3t and 3s are associated with reel brakes 5T and 5S of the take-up and supply reels 7T and 7S, respectively. Also, the brake releaser 3s is associated with a preload brake 6 for releasing it, which is fixed coaxially with the reel brake 5s about its common pivot 5a.

The reel brakes 5T and 5S of the take-up and supply reels can rotate about their pivots 5a, and are pushed against the reel bases 7T and 7S under the influence of springs 5b. Likewise, the preload brake 6 is pushed against the supply reel base 7S under the influence of a spring 6a.

In operation, particularly in tape-loading (or unloading) mode as shown in FIG. 1, the roll follower 4 of the brake releasing member 3 is positioned in the tape-loading control section 2a ($r_1$) of the cam slot 2, while the brake releasing member 3 is rotated about its pivot 3a in the anti-clockwise direction somewhat apart from non-releasing position, that is, in the first position in which only the supply reel brake 5S is released, allowing the take-up reel brake 5T and the preload brake 6 to apply their braking forces to the reel bases 7T and 7S.

Figure 2:
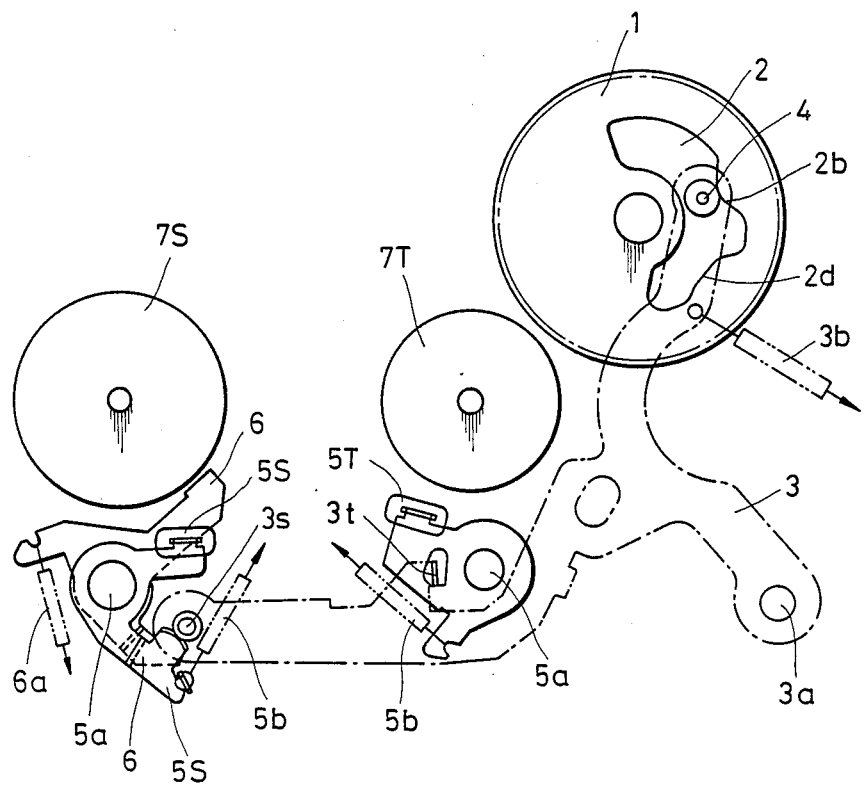

In forward driving or playing mode the cam gear 1a rotates little in the counterclockwise direction, and as shown in FIG. 2, the roll follower 4 of the brake releasing member 3 is positioned in the forward-driving or playing control section 2b ($r_3$) of the cam slot 2, and then the brake-releasing member 3 is rotated to its extremity in the counterclockwise direction, that is, in the third position in which the supply and take-up reel brakes 5T and 5S and the preload brake 6 are released, thus permitting the reel bases 7T and 7S to rotate freely. In reverse driving mode the cam gear 1 rotates until the roll follower 4 of the brake-releasing member 3 is positioned in the reverse-driving control section 2d ($r_3$) of the cam slot 2, accordingly putting the brake releasing member again in the third releasing position.

Figure 3:
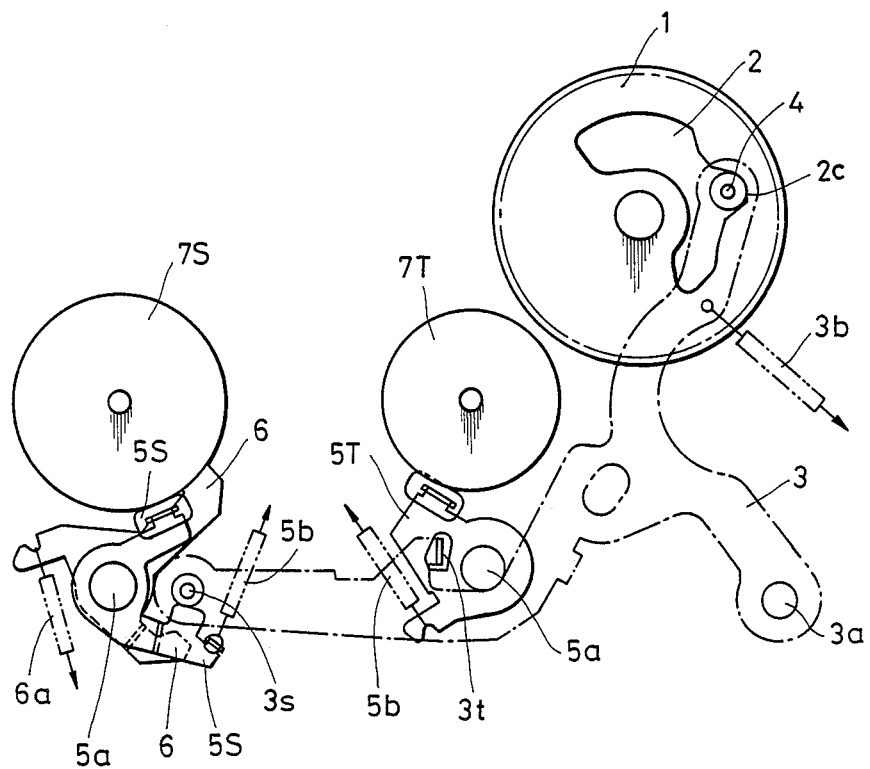

When a stop instruction is dispatched in playing mode, the cam gear 1 rotates little counterclockwise (when a stop instruction is dispatched in reverse driving mode, the cam gear 1 rotates little clockwise) until the roll follower 4 of the brake-releasing member 3 is positioned in the stop control section 2c ($r_0$) as shown in FIG. 3. Then, the brake releasing member 3 rotates clockwise to its extremity. The reel brakes 5T, 5S and preload brake 6 are pushed together against the reel bases 7T and 7S.

Figure 4:
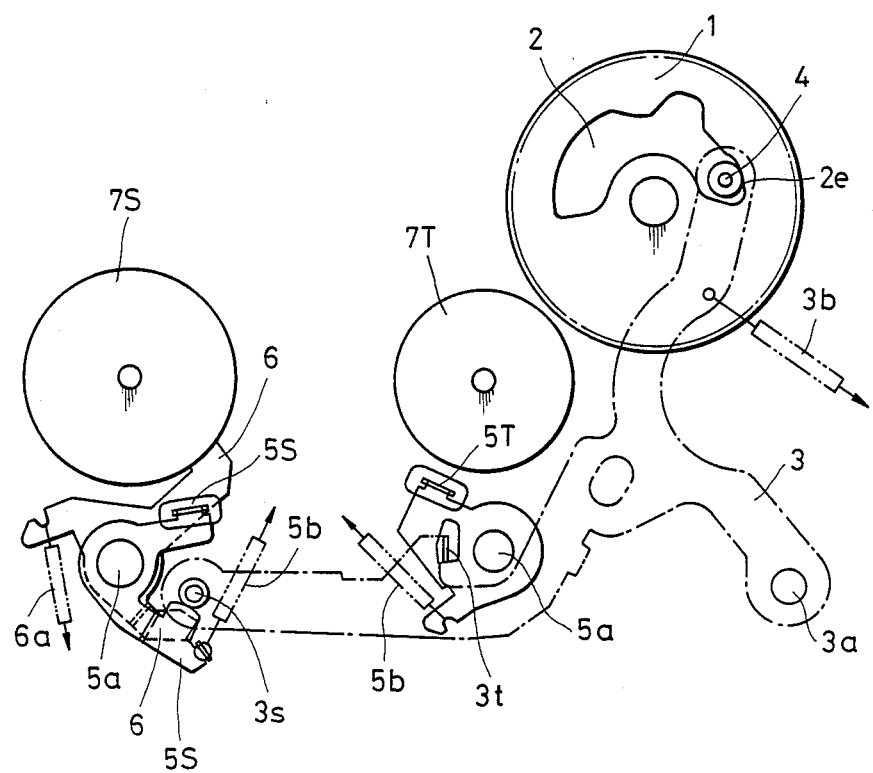

In quick winding mode the cam gear 1 rotates anti-clockwise to its extremity, and then the roll follower 4 of the brake releasing member 3 is positioned in the quick winding control section ($r_2$) as shown in FIG. 4. At the same time the brake releasing member 3 rotates clockwise somewhat apart from the reverse-driving position, that is, in the second releasing position in which both reel brakes 5T and 5S are released, allowing only the preload brake 6 to apply a gentle braking force to the reel base 7S.

As understood from the above, the combination of a single cam gear 1 and an associated brake releasing member 3 carries out systematic timely control of reel and preload brakes 5T, 5S and 6 in response to selection of different operating modes.

Figure 6:
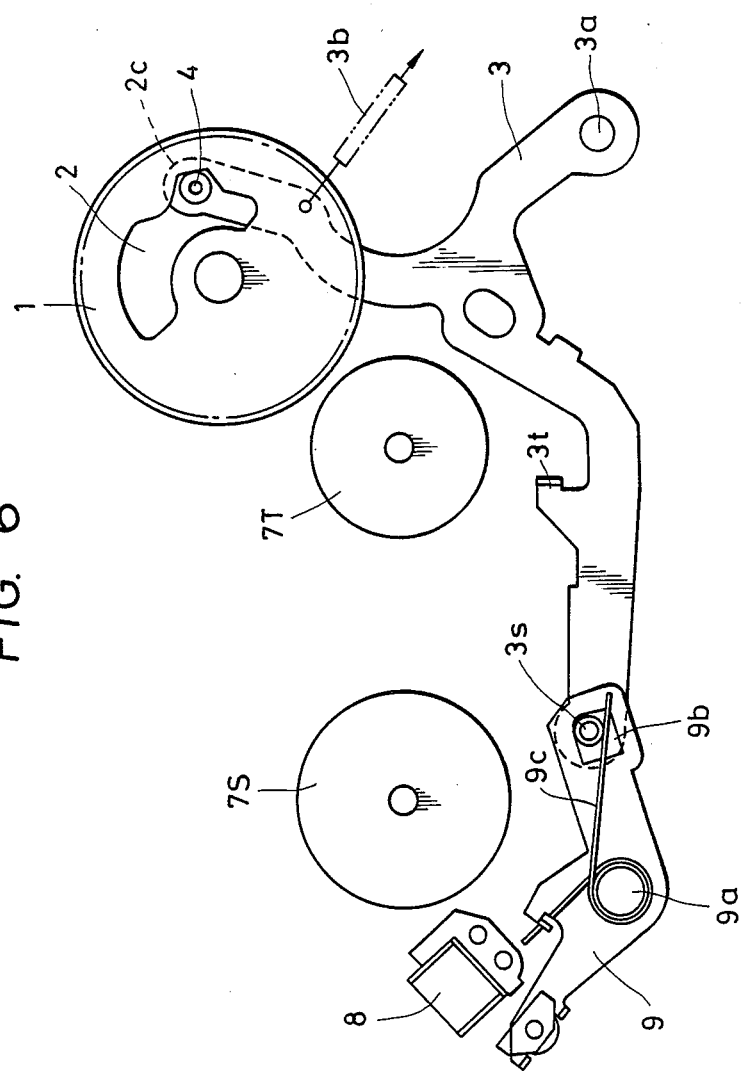
FIGS. 6 and 7 are plan views of a braking mechanism according to another embodiment of the present invention.
Figure 7:
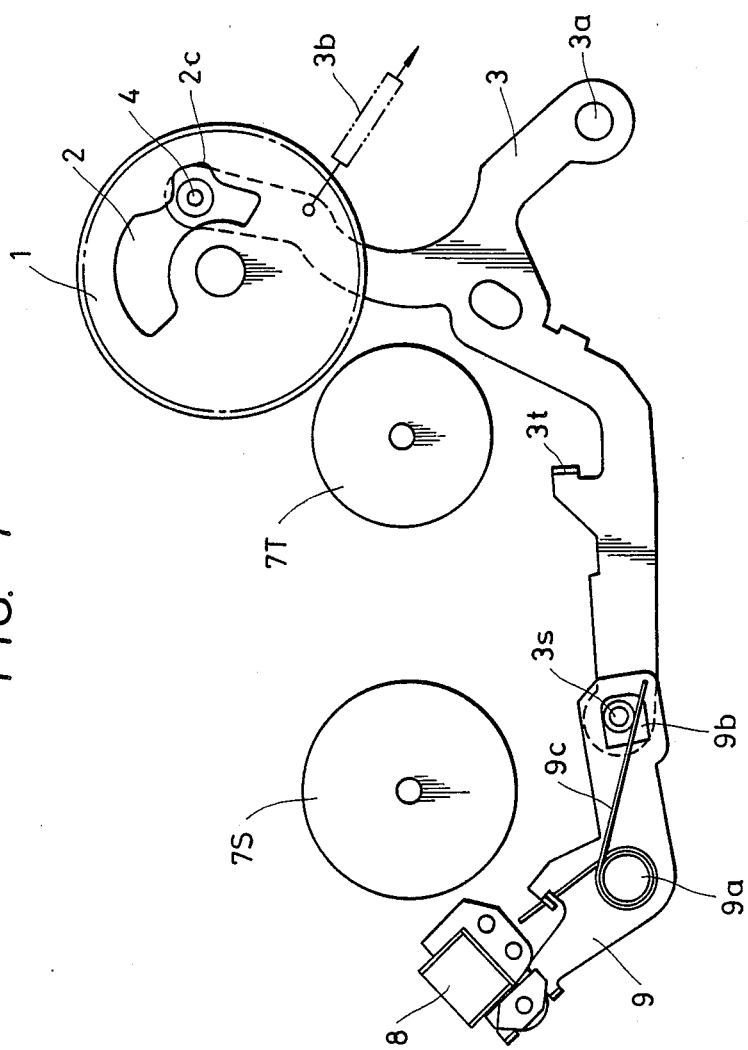

FIGS. 6 and 7 show a braking mechanism according to another embodiment of the present invention. This braking mechanism is different from the one of FIGS. 1 to 5 only in that a suction actuator 8 is provided in the vicinity of the supply base 7S for drawing the brake-releasing member 3, and that a suction member 9 is associated with the brake-releasing member 3 to be drawn to the actuator 8. Specifically the suction member 9 can rotate about its pivot 9a, and it has a catch hole 9b at the end opposite to that which is to be pulled towards the actuator 8. The releasing part 3S of the brake-releasing member 3 is inserted in the catch hole 9b of the suction member 9. The suction member 9 is biased by a spring 9c, thereby putting its free end apart from the actuator 8. The actuator 8 is energized in quick winding mode, and de-energized immediately after quick winding is finished. When the actuator 8 is energized in quick winding mode to pull the free end of the suction member 9, the suction member 9 rotates about its pivot 9a. Then, the other end of the suction member 9 pushes down the end of the brake-releasing member 3 to rotate the brake-releasing member 3 about its pivot 3a to the quick winding (released) position. When the actuator 8 is de-energized, the suction member 9 returns quickly to its initial position.

The braking mechanism of FIGS. 6 and 7 works in the same way as the braking mechanism of FIGS. 1 to 5 in tape-loading, unloading and forward driving or playing. In quick winding it works in a different way. FIG. 6 shows the situation in which the actuator 8 and the suction member 9 assume stop mode. As shown, the roll follower 4 stays on the stop control section 2c of the cam slot 2. Then, the actuator 8 is energized to pull the free end of the suction member 9 towards the actuator 8, and accordingly the brake-releasing member 3 is rotated somewhat counterclockwise to raise the roll follower 4 high to the same level as the quick winding control section ($r_2$). Thus, the brake-releasing member 3 is put in the second releasing position, releasing both reel brakes 5T and 5S, allowing only the preload brake 6 to apply its gentle braking force to the supply reel base 7S. Thus, the braking mechanism is put in quick winding mode.

After finishing the quick winding, the actuator 8 is de-energized, thereby allowing the brake-releasing member 3 to return its initial biased position, causing the roll follower 4 to fall on the stop control section of the cam slot 2 quickly. With this arrangement transition from quick winding mode to stop mode and vice versa can be attained quicker than the embodiment of FIGS. 1 to 5, in which embodiment such transition is effected by rotating the cam gear a predetermined arc length. The quick transition from the quick winding to stop mode permits the exact positioning of the start of a selected record on the magnetic tape, and prevents the loosing of tape between the supply and take-up reels.

As is apparent from the above, the sequential releasing of selected brakes by using a single cam gear and associated brake-releasing member according to the present invention assures coordination of braking operations appropriate for tape-loading, unloading, quick winding, playing and stopping. Such a simple combination of a cam gear and a brake-releasing member permits reduction of the number of required parts and the size of the brake control.

What is claimed is:

1. A braking mechanism for use in a magnetic recording apparatus comprising:
   a take-up reel base;
   a releasable take-up reel base clamping brake;

a supply reel base;

a releasable supply reel base clamping brake;

a releasable preload drag brake configured for engagement with said supply reel base;

a brake-releasing member operable to first, second, third, and fourth member means positions;

first means responsive to member movement to said first member position for operating only said supply reel base clamping brake to a releasing condition for tape loading and unloading;

second means responsive to member movement to said second member position for operating said supply reel base and takeup reel base clamping brakes to a releasing condition;

third means responsive to member movement to said third member means position for operating all of said brakes to a releasing condition for normal playing;

fourth means responsive to member movement to said fourth member means position for operating all of said brakes to an unreleased condition for tape stopping;

a cam gear operable over a plurality of positions and coupled to move said brake-releasing member to said first, third, and fourth member positions according to the various positions of said cam gear.

2. The braking mechanism of claim 1 including member actuating means for actuating said brake-releasing member to said second member position.

3. The braking mechanism of claim 2 wherein said member actuating means includes a coupling member coupled to said brake-releasing member, and a suction actuator disposed to urge said coupling member means to move said brake-releasing member to said second member position responsively to suction produced by said suction actuator.

4. A braking mechanism for use in a magnetic recording apparatus comprising:

a take-up reel base;

a releasable take-up reel base clamping brake;

a supply reel base;

a releasable supply reel base clamping brake;

a releasable preload drag brake configured for engagement with said supply reel base;

brake-releasing member means operable to first second, third, and fourth member means positions;

first means responsive to member means movement to said first member means position for operating only said supply reel base clamping brake to a releasing condition for tape loading and unloading;

second means responsive to member means movement to said second member means position for operating said supply reel base and takeup reel base clamping brakes to a releasing condition for fast forward;

third means responsive to member means movement to said third member means position for operating all of said brakes to a releasing condition for normal playing;

fourth means responsive to member means movement to said fourth member means position for operating all of said brakes to an unreleased condition for tape stopping;

cam means operable over a plurality of positions and having contour-forming means for moving said brakereleasing member means to at least said first, third, and fourth member means positions according to the various positions of said cam means; and member actuating means for actuating said brakereleasing member means to said second member means position.

5. The braking mechanism of claim 4 wherein said member actuating means includes a portion of said contour-forming means on said cam means configured to actuate said brake-releasing member means to said second member means position responsively to movement of said cam means to one of said plurality of cam means positions.

6. The braking mechanism of claim 5 wherein said cam means is configured to move said brake-releasing member sequentially to said first, third, fourth, third, and second member means positions responsively to progressive movement of said cam means.

7. The braking mechanism of claim 4 wherein said member actuating means includes movable coupling member means separate from said cam means and coupled to move said brake-releasing member means to said second member means position, and suction actuator means disposed to urge said coupling member means to move said brake-releasing member means to said second member means position responsively to suction produced by said suction actuator means.

8. The braking mechanism of claim 7 wherein said member actuating means is disposed to move said brake-releasing member means between said second member means position and said fourth member means position when said cam means is positioned to place said brake-releasing member means in said fourth member means position.

9. The braking mechanism of claims 4, 5, 6, 7, or 8 wherein said brake-releasing member means is configured as a single unitary member.

10. The braking mechanism of claims 4, 5, 6, 7, or 8 wherein said cam means is a single cam and said contour-forming means is a single contour on said single cam.

* * * * *